US011677815B2

(12) United States Patent
Jiang et al.

(10) Patent No.: US 11,677,815 B2
(45) Date of Patent: Jun. 13, 2023

(54) SERVICE INVOKING METHOD, DEVICE, APPARATUS AND MEDIUM

(71) Applicant: CHINA UNIONPAY CO., LTD., Shanghai (CN)

(72) Inventors: Bo Jiang, Shanghai (CN); Jien Zhou, Shanghai (CN); Tianyun Niu, Shanghai (CN); Zhao Cheng, Shanghai (CN); Fengke Wu, Shanghai (CN); Zhengfeng Xu, Shanghai (CN); Guanghui Shen, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/619,745

(22) PCT Filed: Sep. 25, 2020

(86) PCT No.: PCT/CN2020/117617
§ 371 (c)(1),
(2) Date: Dec. 16, 2021

(87) PCT Pub. No.: WO2021/135448
PCT Pub. Date: Jul. 8, 2021

(65) Prior Publication Data
US 2022/0360625 A1 Nov. 10, 2022

(30) Foreign Application Priority Data
Dec. 31, 2019 (CN) .......................... 201911413857.5

(51) Int. Cl.
*H04L 67/63* (2022.01)
*H04L 67/1008* (2022.01)
(52) U.S. Cl.
CPC .......... *H04L 67/1008* (2013.01); *H04L 67/63* (2022.05)

(58) Field of Classification Search
CPC ........................... H04L 67/1008; H04L 67/63
(Continued)

(56) References Cited

U.S. PATENT DOCUMENTS 7,685,109 B1 * 3/2010 Ransil .................. G06F 16/951
707/999.003
2009/0037599 A1 2/2009 Shen et al.
(Continued)

FOREIGN PATENT DOCUMENTS

CN 102333029 A 1/2012
CN 104144183 11/2014
(Continued)

OTHER PUBLICATIONS

Notification of Grant dated Apr. 1, 2022 for Chinese patent application No. 201911413857.5.
(Continued)

*Primary Examiner* — Glenford J Madamba
(74) *Attorney, Agent, or Firm* — K&L Gates LLP

(57) ABSTRACT

The application discloses a service invoking method, device, apparatus and medium. The service invoking method includes: receiving a first service request message sent by a service invoking end; determining, in response to the first service request message, header information of the first service request message; determining, under a condition that the header information includes a route identification, a target data center among a plurality of data centers according to the route identification; sending the first service request message to the target data center to enable the target data center to provide service for the service invoking end. Based on the embodiments of the application, efficiency of service invoking can be improved.

16 Claims, 4 Drawing Sheets

(58) Field of Classification Search
USPC .......................................................... 709/219
See application file for complete search history.

(56) References Cited

U.S. PATENT DOCUMENTS

| | | | |
|---|---|---|---|
| 2014/0122572 | A1 | 5/2014 | Finkelstein et al. |
| 2018/0227385 | A1 | 8/2018 | Showalter et al. |
| 2019/0363989 | A1 | 11/2019 | Shalev et al. |

FOREIGN PATENT DOCUMENTS

| | | | | | |
|---|---|---|---|---|---|
| CN | 105915427 | | 8/2016 | | |
| CN | 107633016 | A | 1/2018 | | |
| CN | 108011826 | A | 5/2018 | | |
| CN | 108259605 | | 7/2018 | | |
| CN | 108881448 | A | 11/2018 | | |
| CN | 109120697 | | 1/2019 | | |
| CN | 109445960 | | 3/2019 | | |
| CN | 109525550 | A | 3/2019 | | |
| CN | 110333957 | | 10/2019 | | |
| CN | 110333957 | A | * 10/2019 | | |
| CN | 110336865 | | 10/2019 | | |
| CN | 110581890 | A | 12/2019 | | |
| CN | 110602169 | | 12/2019 | | |
| CN | 110622484 | A | * 12/2019 | ............. | G06F 16/27 |
| CN | 110913025 | | 3/2020 | | |
| CN | 108259605 | B | * 8/2021 | ......... | H04L 67/2833 |
| EP | 3334136 | | 6/2018 | | |

OTHER PUBLICATIONS

The Extended European Search Report dated Jul. 12, 2022 for European Patent Application No. 20909561.1.
First Office Action dated Apr. 2, 2021 for Chinese patent application No. 201911413857.5.
Second Office Action dated Oct. 26, 2021 for Chinese patent application No. 201911413857.5.
International Search Report and Written Opinion dated Dec. 31, 2020 for International PCT Application No. PCT/CN2020/117617.
The Examination Report dated Aug. 16, 2022 for Indian Patent Application No. 202117058781.

* cited by examiner

SERVICE INVOKING METHOD, DEVICE, APPARATUS AND MEDIUM

CROSS-REFERENCE TO RELATED APPLICATION

This application is a National Stage of International Application No. PCT/CN2020/117617, filed on Sep. 25, 2020, which claims priority of Chinese patent application No. 201911413857.5 entitled "service invoking method, device, apparatus and medium" filed on Dec. 31, 2019, both of which are incorporated herein by reference in their entirety for all purposes.

TECHNICAL FIELD

This application relates to the field of communication technology, in particular to a service invoking method, device, apparatus and medium.

BACKGROUND

In a case where multiple data centers exist in a distributed service system, when the distributed service system receives a service request message sent by a service invoking end, it first needs to distribute the received service request message, and then send the service request message to a corresponding data center according to a distribution result so as to enable the data center to provide corresponding service for the service invoking end.

Message distribution methods in related technologies are generally implemented through an Application Programming Interface (API) gateway server of the distributed service system. However, in the process of these methods, the service request message needs to be forwarded between multiple data centers across a wide area network, so that efficiency of service invoking is low.

SUMMARY

Embodiments of the present application provide a service invoking method, device, apparatus and medium, which may improve efficiency of service invoking.

In a first aspect, an embodiment of the present application provides a service invoking method, including: receiving a first service request message sent by a service invoking end; determining, in response to the first service request message, header information of the first service request message; determining, under a condition that the header information includes a route identification, a target data center among a plurality of data centers according to the route identification; sending the first service request message to the target data center to enable the target data center to provide service for the service invoking end.

In a second aspect, an embodiment of the present application provides a service invoking method, including: obtaining a first service request message, wherein header information of the first service request message does not include a route identification; allocating a target data center among a plurality of data centers to a service invoking end that sends the first service request message; generating a route identification corresponding to the service invoking end according to a data center identification corresponding to the target data center; sending the route identification corresponding to the service invoking end to the service invoking end.

In a third aspect, an embodiment of the present application provides a service invoking device, including: a first message receiving module configured to receive a first service request message sent by a service invoking end; a first message processing module configured to determine, in response to the first service request message, header information of the first service request message; a first center determination module configured to determine, under a condition that the header information includes a route identification, a target data center among a plurality of first data centers according to the route identification; a request message sending module configured to send the first service request message to the target data center to enable the target data center to provide service for the service invoking end.

In a fourth aspect, an embodiment of the present application provides a service invoking device, including: a second message receiving module configured to obtain a first service request message, wherein header information of the first service request message does not include a route identification; a second center determination module configured to allocate a target data center among a plurality of data centers to a service invoking end that sends the first service request message; a route identification generation module configured to generate a route identification corresponding to the service invoking end according to a data center identification corresponding to the target data center; a route identification sending module configured to send the route identification corresponding to the service invoking end to the service invoking end.

In a fifth aspect, an embodiment of the present application provides a service invoking apparatus, including: a processor and a memory storing computer program instructions, wherein the processor, when executing the computer program instructions, implements an operation of the service invoking method according to the first aspect or the second aspect.

In a sixth aspect, an embodiment of the present application provides computer-readable storage medium storing computer program instructions thereon, wherein the computer program instructions, when executed by a processor, implement an operation of the service invoking method according to the first aspect or the second aspect.

In the service invoking method, device, apparatus, and medium of the embodiments of the present application, when the first service request message sent by the service invoking end is received, the target data center corresponding to the service invoking end may be determined among the plurality of data centers based on the route identification in the header information of the first service request message and the first service request message may be sent to the determined target data center, so as to enable the target data center to provide service for the service invoking end.

BRIEF DESCRIPTION OF THE DRAWINGS

Features, advantages, and technical effects of exemplary embodiments of the present application will be described below with reference to the accompanying drawings.

DETAILED DESCRIPTION

Figure 1:
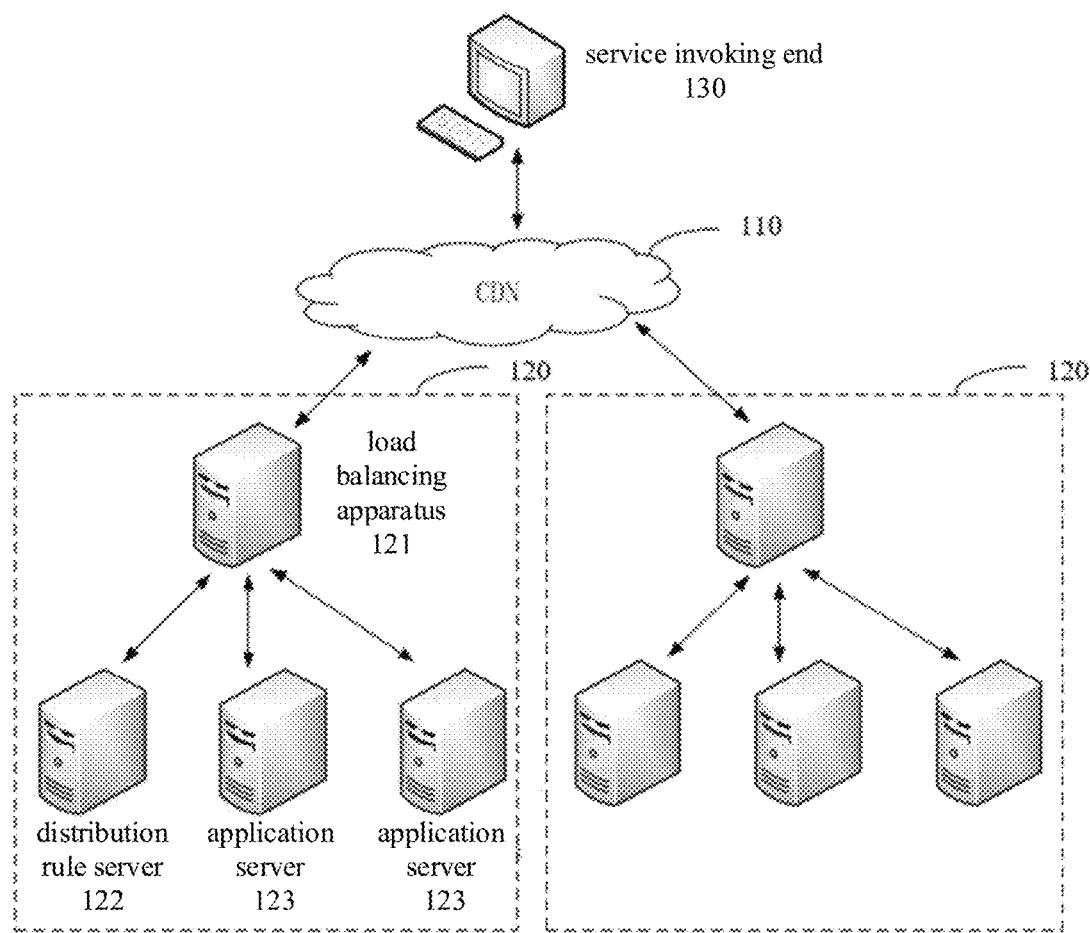
FIG. 1 is a system architecture diagram of an exemplary distributed service system.

Implementation of the present application will be further described in detail below in conjunction with the accompanying drawings and embodiments. The detailed description and drawings of the following embodiments are used to exemplarily illustrate a principle of the present application, but cannot be used to limit the scope of the present application, that is, the present application is not limited to the described embodiments.

In the description of this application, it should be noted that relational terms such as first and second are only used to distinguish one entity or operation from another entity or operation, and do not necessarily require or imply that there is any such actual relationship or sequence between these entities or operations. Moreover, the terms "include", "comprise" or any other variants thereof are intended to cover non-exclusive inclusion, so that a process, method, article or apparatus including a series of elements not only includes these elements, but also includes other elements that are not explicitly listed, or also include elements inherent to this process, method, article or apparatus. If there are no more restrictions, the element defined by the sentence "comprising . . . " does not exclude the existence of other same elements in the process, method, article, or apparatus that includes the element.

In a case where multiple data centers exist in a distributed service system, when the distributed service system receives a service request message sent by a service invoking end, it first needs to distribute the received service request message, and then send the service request message to a corresponding data center according to a distribution result so as to enable the data center to provide corresponding service for the service invoking end.

In the distributed service system of related technologies, the distribution of the service request message is generally implemented through an API gateway server of the distributed service system. However, during the distribution of the service request message, the service request message needs to be forwarded between multiple data centers across a wide area network, so that the efficiency of service invoking is low. In addition, the distribution strategy of the API gateway server is coupled with a forwarding function, which makes configuration of the distribution strategy not flexible enough. Furthermore, the API gateway server needs to carry all service invoking traffic, and requirements for performance of the API gateway server is also greater.

In order to solve the problems of the prior art, the embodiments of the present application propose a service invoking method, device, apparatus, and medium based on a distributed service system, which may add a route identification field to header information of the service request message for invoking a service, so that the header information carries the route identification used to determine the data center corresponding to the service request message. Therefore, when a message distribution apparatus such as a Content Delivery Network (CDN), an application system server, etc. that performs the distribution or tracing-to-source receives the service request message, it may directly distribute it to the data center corresponding to the route identification based on the route identification, so as to realize routing function of the service request message.

FIG. 1 is a system architecture diagram of an exemplary distributed service system. As shown in FIG. 1, the distributed service system includes a CDN 110 and multiple data centers 120. Each data center 120 includes a load balancing apparatus 121, a distribution rule server 122, and multiple application servers 123. The CDN 110 may be in communication connection with the load balancing apparatus 121 of each data center 120. Each load balancing apparatus 121 may be in communication connection with the multiple application servers 123 and the distribution rule server 122 in the data center 120 to which it belongs.

In the embodiments of the present application, the service invoking end 130 that sends the service request message may be a server or an electronic device. The CDN 110 may include multiple content distribution servers.

In the embodiments of the present application, the various servers mentioned above may be a high-performance electronic calculator for storing and processing data. An electronic apparatus includes but not limited to a mobile phone, a tablet, a notebook, a handheld computer, a vehicle-mounted terminal, a wearable device, a pedometer, etc.

Specifically, each content distribution server of the CDN 110 is respectively configured to determine, after receiving the service request message sent by the service invoking end 130, a target data center corresponding to the service request message among the multiple data centers 120 using the route identification carried in the header information of the received service request message and send the service request message to the target data center, so as to quickly complete the distribution of the service request message. The load balancing apparatus 121 of the data center 120 is configured to determine, after receiving the service request message, an application server 123 that provides service for the service invoking end 130 among the multiple application servers 123, and send the service request message to the determined application server 123. The application servers 123 of the data center 120 are used to provide service for the service invoking end 130. The distribution rule server 122 of the data center 120 is configured to allocate, in response to receiving a service request message that does not carry a route identification in its header information, a target data center to the service invoking end that sends the service request message, and generate a route identification corresponding to the service invoking end.

The service invoking methods provided by the embodiments of the present application will be first introduced below.

Figure 2:
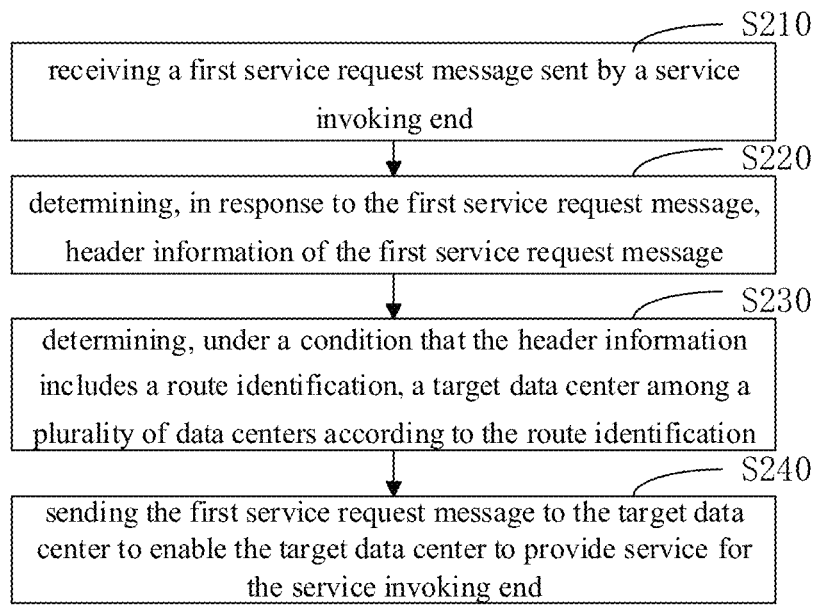
FIG. 2 is a schematic flowchart of an embodiment of a service invoking method of the present application.

FIG. 2 is a schematic flowchart of an embodiment of a service invoking method of the present application.

In some embodiments of the present application, the service invoking method shown in FIG. 2 may be executed by a message distribution apparatus, for example, any content distribution server of the CDN 110 shown in FIG. 1 or any application system server. As shown in FIG. 2, the service invoking method may include:

S210: receiving a first service request message sent by a service invoking end;

S220: determining, in response to the first service request message, header information of the first service request message;

S230: determining, under a condition that the header information includes a route identification, a target data center among a plurality of data centers according to the route identification;

S240: sending the first service request message to the target data center to enable the target data center to provide service for the service invoking end.

In the embodiments of the present application, when the first service request message sent by the service invoking end is received, the target data center corresponding to the service invoking end may be determined among the plurality of data centers based on the route identification in the header information of the first service request message and the first service request message may be sent to the determined target data center, so as to enable the target data center to provide service for the service invoking end. In this way, distribution of the first service request message may be implemented with the route identification quickly and efficiently, so that the efficiency of service invoking is improved.

In S210 of some embodiments of the present application, the service invoking end may be the service invoking end 130 shown in FIG. 1. The service invoking end 130 may send the first service request message to the CDN 110 shown in FIG. 1 when it needs to invoke a service via the distributed service system. After the content distribution server of the CDN 110 receives the first service request message sent by the service invoking end 130, the content distribution server may route the first service request message, and distribute it to the corresponding data center.

In S220 of some embodiments of the present application, the first service request message may be parsed to obtain a request header of the first service request message, and then the request header is parsed to obtain header information in the request header. The header information may include a field name and a field value of a respective field in the request header. Specifically, when a field in the request header is the route identification field, the route identification is the field value of the field.

In an example, the route identification field in the header information is represented as the dcTag field, dcTag is a key of the field. If the route identification is ABCX and ABCX is the value of the field, then A represents a first tracing-to-source data center identification, and B represents a second tracing-to-source data center identification, C represents a third tracing-to-source data center identification, and X is a reserved bit.

Before S230 in some embodiments of the present application, it is also necessary to determine whether the header information includes a route identification field according to the header information, and determine whether the route identification field includes the route identification, and then perform different distribution strategies on the first service request message according to the result of the determination.

In S230 of some embodiments of the present application, under a condition that it is determined that the header information includes the route identification field and the route identification, it may be determined that the first service request message is not the first sent message by the service invoking end, and the target data center may be determined directly based on the route identification. The first sent message by the service invoking end refers to the message sent when the service invoking end or the application program is started.

In some embodiments, under a condition that the route identification includes only one data center identification, the data center corresponding to the data center identification may be directly used as the target data center.

In some other embodiments, under a condition that the route identification includes multiple data center identifications, a data center corresponding to a data center identification selected directly from the multiple data center identifications according to a predetermined selection rule or randomly may be used as the target data center.

However, in practice, the service request message received by the message distribution apparatus may be an attack message or an illegal message. The header information of the message may also carry a route identification, but the route identification may include a data center identification that cannot be recognized by the message distribution apparatus. Therefore, in S230 of some other embodiments of the present application, under a condition that the header information includes the route identification field and the route identification, legitimacy of the route identification may first be verified to determine whether the route identification is a legal identification. Only when the route identification is the legal identification, the target data center will be determined based on the route identification.

In these embodiments, optionally, a specific method of S230 may include:

obtaining a preset data center identification;

determining whether the route identification is a legal identification according to the preset data center identification;

determining, under a condition that it is determined that the route identification is the legal identification, the target data center among the plurality of data centers according to the route identification.

In the embodiments of the present application, the message distribution apparatus may receive and store the preset data center identification corresponding to each data center. Therefore, the message distribution apparatus may determine whether the route identification is the legal identification according to the stored preset data center identification. When it is determined that the route identification is the legal identification, the target data center may be determined among the multiple data centers according to the route identification.

In some embodiments of the present application, it is possible to determine whether the route identification is the legal identification only based on the preset data center identification, that is, if the preset data center identification includes a first data center identification that does not match the preset data center identification, it is determined that the route identification is not the legal identification; and if the preset data center identification does not include the first data center identification that does not match the preset data center identification, it is determined that the route identification is the legal identification.

Therefore, the legitimacy of the route identification may be determined simply and quickly, and the first service request message is stopped being responded to or it is responded to by default. It being responded to by default refers to assigning the first service request message to a default data center when it is determined that the route identification is not the legal identification, so as to enable the default data center to provide the service corresponding to the first service request message. In this way, it can be avoided that the first service request message sent by a compatible platform is erroneously shielded.

In some other embodiments of the present application, in order to further avoid erroneously shielding the first service request message sent by the compatible platform, it is also possible to comprehensively determine whether the route identification is the legal identification based on the preset data center identification and an operation state of each data center.

In these embodiments, optionally, a specific method for the determining whether the route identification is a legal identification according to the preset data center identification may include:

determining whether the route identification includes a first data center identification, the first data center identification being a data center identification that does not match the preset data center identification;

determining, under a condition that it is determined that the route identification does not include the first data center identification, that the route identification is the legal identification.

In the embodiments of the present application, each data center identification in the route identifications may be sequentially verified according to the sequence of the route identifications to determine whether the data center identification is a data center identification that does not match the preset data center identification.

In an example, the preset data center identifications are A and B, if the route identifications are A, B, AB, or BA, since there are no identifications other than A and B in these route identifications, these route identifications are all legal identifications.

In these embodiments, optionally, after the determining, according to the preset data center identification, whether the route identification includes a first data center identification, a specific method for determining whether the route identification is the legal identification may further include:

determining, under a condition that it is determined that the route identification includes the first data center identification, whether the route identification includes a second data center identification, an identification location of the second data center identification being before an identification location of the first data center identification and the second data center identification matches the preset data center identification;

obtaining, under a condition that it is determined that the route identification includes the second data center identification, an operation state of a data center corresponding to each second data center identification;

determining, under a condition that it is determined that the second data center identification includes a third data center identification, that the route identification is the legal identification, the third data center identification being a data center identification corresponding to a data center with a normal operation state;

determining, under a condition that it is determined that the route identification does not include the second data center identification or the second data center identification does not include the third data center identification, that the route identification is not the legal identification.

In the embodiments of the present application, when it is determined that the route identification includes the first data center identification, it can be searched before the first data center identification whether there is the second data center identification that matches the preset data center identification. If there is no the second data center identification, it is indicated that the route identification is not the legal identification. If there is the second data center identification, it is necessary to further determine the operation state of the data center corresponding to the second data center identification. If the second data center identification includes the third data center identification, it means that the route identification is the legal identification; and if the second data center identification does not include the third data center identification, it means that the route identification is not the legal identification.

In an example, the preset data center identifications are A and B, the route identification is AY, Y is not the preset data center identification, and the preset data center identification A exists before Y. If the operation state of A is normal, AY is a legal identification. If the operation state of A is not normal, AY is not a legal identification.

In an example, the preset data center identifications are A and B, the route identification is AYB, Y is not the preset data center identification, and the preset data center identification A exists before Y. If the operation state of A is normal, AY is a legal identification. If the operation state of A is not normal, AY is not a legal identification. It can be seen that whether the route identification being a legal identification has nothing to do with B after Y.

In an example, the preset data center identifications are A and B. If the route identification is YA, Y is not the preset data center identification, and no identification that is the preset data center identification exists before Y, then AY is not a legal identification.

In the embodiments of the present application, there may be many situations where the operation state is not normal, for example, the data center is in a maintenance state, a disaster occurs in the data center, or the data center is not started, etc., which are not limited here.

In the embodiments of the present application, if the header information does not include the route identification field, the route identification field does not include the route identification, or the route identification is not a legal identification, then the first service request message may be responded to by default.

In some embodiments, after determining whether the route identification is a legal identification according to the preset data center identification, the service invoking method may further include:

determining, under a condition that it is determined that the route identification is not the legal identification, a target default data center among at least one default data center;

sending the first service request message to the target default data center to enable the target default data center to provide service for the service invoking end.

Therefore, it is possible to assign a target default data center in a default tracing-to-source address pool to the first service request message whose route identification is not a legal identification, so as to use the target default data center to provide service for it.

Specifically, since it is the first service request message whose route identification is not a legal identification to be responded to, the selected at least one default data center and the target default data center may both be a data center without the distribution rule server 122 shown in FIG. 1.

In some other embodiments, after determining the header information of the first service request message, the service invoking method may further include:

determining, under a condition that the header information does not include the route identification, a target default data center among at least one default data center;

sending the first service request message to the target default data center to enable the target default data center to provide service for the service invoking end.

Therefore, it is possible to assign a target default data center in the default tracing-to-source address pool to the first service request message that does not include the route identification field in the header information or does not include route identification in the route identification field, so as to use the target default data center to provide service for it.

Specifically, since the header information does not include the route identification, it may can be determined that the first service request message is the first message sent by the service invoking end. Therefore, the selected at least one default data center and the target default data center may both be the data center with the distribution rule server 122 shown in FIG. 1 to allocate the route identification corresponding to the target data center for the service invoking end. In this way, the service invoking end may add the route identification to the header information of the service request message to be sent subsequently during operation after this startup or during usage after the application is started, so that the message distribution apparatus can quickly distribute the service request message to the corresponding data center.

Taking the first service request message being the first message as an example, how to determine the target default data center for the first service request message will be described in detail below.

In the distributed service system, the message distribution apparatus may be preset with at least one default data center. These default data centers constitute the default tracing-to-source address pool. The default data centers may be either the above-mentioned data centers or data centers other than the above-mentioned data centers, which is not limited here.

When the service invoking end sends a service request message for the first time, as the distributed service system has not yet assigned a target data center for the service invoking end, the route identification field in the header information of the first service request message does not include the route identification. When the message distribution apparatus receives the first service request message and determines that the first service request message does not include the route identification, it may select a default data center among the at least one default data center according to a predetermined selection rule or randomly as the target default data center, and send the first service request message to the target default data center, so as to enable the target default data center to provide service for the service invoking end.

In some implementations of this application, in order to ensure the route identification corresponding to the target data center allocated by the distributed service system is carried when the service invoking end that sends the first service request message in the above situation continue to invoke service, after sending the first service request message to the target default data center, the service invoking method may further include:

receiving the route identification fed back by the target default data center;

sending the route identification to the service invoking end to enable the service invoking end to generate a second service request message according to the route identification.

Specifically, description will be detailed about the method for the target default data center to generate the route identification for the service invoking end that sent the first service request message, which will not be repeated here.

In the embodiments of the present application, after receiving the route identification fed back by the target default data center, the received route identification may be sent to the service invoking end that sent the first service request message, so as to enable the service invoking end to generate, based on the route identification, the second service request message in next service invoking.

Specifically, when the service invoking end receives the route identification, it may store the route identification in a memory, and add the route identification to the route identification field in the header information of the service request message each time when sending the service request message before ending the operation after this startup or the usage after the application is started. However, if the service invoking end or the application of the service invoking end is closed, restarted, or fails, as the route identification is stored in the memory, it will not be stored persistently. When the service invoking end or the application of the service invoking end is restarted, a service request message with an empty route identification field will also be sent.

In some embodiments of the present application, under a condition that the route identification is determined to be a legal identification, a specific method for determining a target data center among a plurality of data centers according to the route identification may include:

obtaining an operation state of each data center;

determining, under a condition that the route identification includes a fourth data center identification, the target data center among the plurality of data centers according to the fourth data center identification, the fourth data center identification being a data center identification corresponding to a data center with a normal operation state.

In the embodiments of the present application, the operation state of the data center may include a normal operation state, a maintenance state, a disaster occurring in the data center, the data center not being started, and so on. The maintenance state needs to be manually set by an operation and maintenance personnel through a platform control apparatus corresponding to the distributed service system. When the message distribution apparatus receives notification information indicating that the operation state of any data center changes from the normal operation state to other operation state, the data center will be isolated, and the message distribution apparatus will not perform a live detection on the data center on its one initiative in the subsequent process. When the operation state of the data center returns to the normal operation state, the message distribution apparatus will receive notification information indicating that the data center has returned to the normal operation state, so as to release the isolation of the data center.

In some embodiments, the service invoking method may further include:

stopping, under a condition that the route identification does not include the fourth data center identification, responding to the first service request message.

If the operation state of all the data centers corresponding to the route identification is not in the normal operation state, as the data and logs for the service invoking by the service invoking end are stored in the data center corresponding to the route identification, it is impossible to continue to provide service for the service invoking end. The message distribution apparatus needs to stop responding to the first service request message, that is, the response to the first service request message fails.

In some other embodiments, a specific method for determining the target data center among the plurality of data centers according to the fourth data center identification may include:

determining a fifth data center identification in the fourth data center identification, an identification location of the fifth data center identification being the first in the fourth data center identification;

using a data center corresponding to the fifth data center identification as the target data center.

In the embodiments of the present application, the fifth data center identification may be selected based on the order of the fourth data center identifications, and the data center corresponding to the fifth data center identification may be used as the target data center.

In some embodiments of the present application, as the message distribution apparatus needs to communicate with the data centers through a transmission line, the transmission line may also be selected when the first service request message is sent to the target data center.

In S240 of some embodiments, a specific method of sending the first service request message to the target data center may include:

determining a target transmission line from a normal transmission line corresponding to the target data center;

sending the first service request message to the target data center using the target transmission line.

It can be seen that in the embodiments of the application, the target transmission line will only be determined from the normal transmission line corresponding to the target data center, so as to send the first service request message to the target data center using the target transmission line. In this way, successful transmission of the first service request message to the target data center can be ensured.

In some other embodiments, before determining a target transmission line from a normal transmission line corresponding to the target data center, the service invoking method may further include:

obtaining line invoking data of a plurality of transmission lines corresponding to the target data center, the line invoking data including a number of consecutive invoking failures and/or invoking feedback data;

determining the normal transmission line among the plurality of transmission lines according to the line invoking data.

Specifically, the message distribution apparatus whether sends a service request message to the target data center for the first time or continuously sends a service request message to the target data center, it will detect the plurality of transmission lines corresponding to the target data center at predetermined time intervals, so as to determine the normal transmission line corresponding to the target data center.

In some embodiments, the line invoking data may include invoke feedback data. For example, if the invoke feedback data corresponding to any transmission line is normal response feedback information, it may be determined that the transmission line is a normal transmission line.

In some other embodiments, the line invoking data may include the number of consecutive invoking failures. The number of consecutive invoking failures may be determined based on the number of times the data center does not respond or the number of response error notification information returned. If the number of consecutive invoking failures of any transmission line does not exceed a predetermined number, it may be determined that the transmission line is a normal transmission line.

In yet some other examples, after obtaining line invoking data of a plurality of transmission lines corresponding to the target data center, the service invoking method may further include:

determining an abnormal transmission line among the plurality of transmission lines according to the line invoking data;

performing a live detection on the abnormal transmission line every preset time period to obtain a live detection result;

updating the abnormal transmission line whose live detection result is success as the normal transmission line.

In some embodiments, the line invoking data includes invoking feedback data. For example, if the invoking feedback data corresponding to any transmission line indicates that the data center does not respond or response error notification information is returned, it may be determined that the transmission line is an abnormal transmission line.

In some other embodiments, the line invoking data may include the number of consecutive invoking failures. If the number of consecutive invoking failures for any transmission line exceeds a predetermined number, it may be determined that the transmission line is an abnormal transmission line.

After the abnormal transmission line is determined, a live detection needs to be performed every preset time period, for example, the live detection needs to be performed every 30 seconds on the abnormal transmission line. As long as the live detection is successful, the transmission line will be changed to a normal transmission line, which may participate in the transmission of service request messages.

In still some other embodiments, after determining the normal transmission line among the plurality of transmission lines according to the line invoking data, the service invoking method may further include:

stopping, under a condition that the plurality of transmission lines do not include the normal transmission line, responding to the first service request message.

Specifically, even if all the transmission lines corresponding to the target data center are abnormal transmission lines, the message distribution apparatus will not switch the data center, and the data center will be isolated through a maintenance interface after a manual decision.

In some embodiments of the present application, as shown in FIG. 1, the data center 120 includes a load balancing apparatus 121, and a specific method of S240 may also include:

sending the first service request message to the load balancing apparatus in the target data center, to enable the load balancing apparatus to select a target application server among a plurality of application servers in the target data center according to a load balancing strategy, so as to enable the target application server to provide service for the service invoking end.

In some other embodiments of the present application, if each data center does not include the load balancing apparatus, a specific method of S240 may also include:

selecting a target application server among a plurality of application servers in the target data center according to a load balancing strategy;

sending, according to a server address of the target application server, the first service request message to the target application server, so as to enable the target application server to provide service for the service invoking end.

In an embodiment of the present application, a specific process for the message distribution apparatus to execute the message distribution process may include:

parsing, after the message distribution apparatus receives the first service request message sent by the service invoking end, the first service request message to obtain the header information.

Generally, if the received first service request message is the first message, the header information does not include the route identification. If the received first service request message is not the first message, the header information includes the route identification.

After determining that the header information does not include the route identification, the message distribution apparatus may allocate a target default data center with a distribution rule server among the at least one default data center, send the first service request message to the target default data center to enable the distribution rule server of the target default data center to allocate the target data center, and generate the route identification corresponding to the service invoking end, so that the service invoking end can generate the second service request message based on the route identification. After the service invoking end stops this startup or the application stops this startup, if the service invoking end needs to start again or the application needs to start again, it will send out a service request message with the route identification in the header information again.

After determining that the header information includes the route identification, the message distribution apparatus may identify whether the route identification is a legal identification. If it is not a legal identification, the target default data center may be determined among the at least one default data center; and if it is a legal identification, the target default data center may be determined according to the route identification, and the first service request message may be sent to the target data center.

To sum up, in the embodiments of the present application, as the message distribution apparatus can realize the distribution of the service request message only based on the route identification without obtaining a business element in the service request message, such as a user identification and a user communication account, or the like. This prevents user privacy from being exposed to the provider of the message distribution apparatus, and can improve the security of user privacy.

Figure 3:
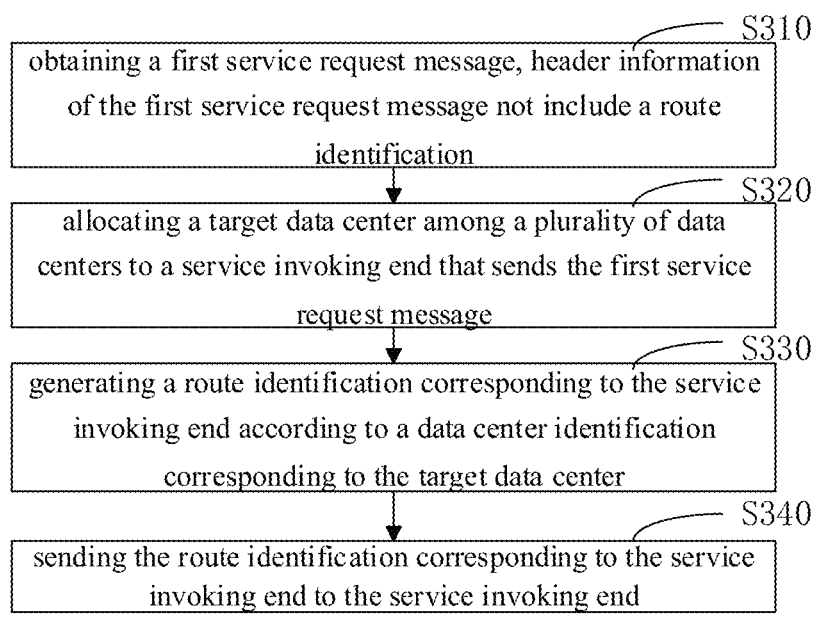
FIG. 3 is a schematic flowchart of another embodiment of a service invoking method of the present application.

FIG. 3 is a schematic flowchart of another embodiment of a service invoking method of the present application.

In some embodiments of the present application, the service invoking method shown in FIG. 3 may be executed by a routing apparatus, for example, the distribution rule server 122 shown in FIG. 1. As shown in FIG. 3, the service invoking method may include:

S310: obtaining a first service request message, header information of the first service request message not include a route identification;

S320: allocating a target data center among a plurality of data centers to a service invoking end that sends the first service request message;

S330: generating a route identification corresponding to the service invoking end according to a data center identification corresponding to the target data center;

S340: sending the route identification corresponding to the service invoking end to the service invoking end.

In the embodiments of the present application, the route identification may be generated for the service invoking end that sends the first service request message without the route identification in the header information, so that the service invoking end may generate a new service invoking request according to the route identification. In this way, when the message distribution apparatus receives a service request message sent by the service invoking end again, it may determine the target data center corresponding to the service invoking end based on the route identification, and send the service request message to the target data center. Thus, distribution of the first service request message can be realized quickly and efficiently, and the efficiency of service invoking can be improved.

In addition, in the embodiments of the present application, in the routing device, the target data center may be allocated to the service invoking end and the route identification corresponding to the service invoking end may be generated, thus routing configuration may be separated from the message distribution apparatus, and the message distribution apparatus is not required to cooperate in the configuration. Therefore, flexibility of routing configuration, adjustment and maintenance is improved.

In some embodiments of the present application, the load balancing apparatus in the target default data center to which the routing device belongs may parse the first service request message. If a request service address in the first service request message is a target request service address, it may be determined that the first service request message is the first message sent by the service invoking end, that is, the header information of the first service request message does not include the route identification.

In some embodiments of the present application, a specific method of S320 may include:

determining a load amount of each data center;

allocating, according to the load amount, the target data center among the plurality of data centers to the service invoking end that sends the first service request message.

Specifically, each data center has a distribution weight. The distribution weight may be configured and adjusted by the user, or it may be a fixed weight.

The routing device may calculate the load amount of each data center at the moment when the first service request message is received, according to the distribution weight corresponding to each data center and the actual number of allocated messages, and then select a preset number of data centers with the smallest load amount as the target data center.

In some other embodiments of the present application, a specific method of S330 may further include:

obtaining request user information corresponding to the first service request message, the request user information including at least one of a request user identification and request user location information;

allocating, according to the request user information, the target data center among the plurality of data centers to the service invoking end that sends the first service request message.

In some embodiments, the distance between the service invoking end and each data center may be determined according to the user location information, and then a preset number of data centers with the smallest distance may be selected as the target data center.

In some other embodiments, it is possible to determine whether a user is a target user based on the request user identification, such as a user with specific business needs such as certain gray-scale release, marketing of specialized groups, etc. If it is a target user, a data center designated by the target user among the data centers may be used as the target data center.

Therefore, in the embodiments of the present application, the route identification may be generated for the service invoking end based on the load amount of each data center and/or the request user information. The distribution strategy is very flexible and has high reference value.

In S340 of some embodiments of the present application, the routing device may store the same preset data center identification as the message distribution apparatus, find the data center identification corresponding to the target data center in the preset data center identification, determine a priority of each target data center, and generate the route identification corresponding to the service invoking end according to the priority.

If the target data center is selected based on the load amount, the smaller the load amount, the higher the priority of the target data center. If the target data center is selected based on the user location information, the smaller the distance, the higher the priority of the target data center.

In S350 of some embodiments of the present application, the routing device may send the route identification to the message distribution apparatus through the load balancing apparatus in the target default data to which it belongs, and the message distribution apparatus may forward the route identification to the service invoking end.

Figure 4:
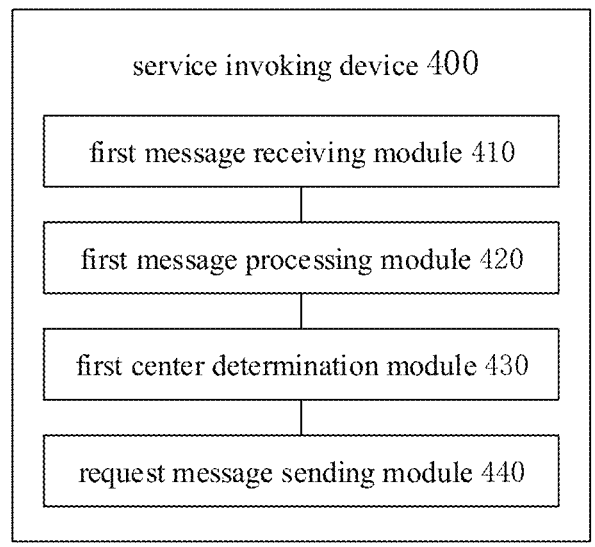
FIG. 4 is a schematic structural diagram of an embodiment of a service invoking device of the present application.

FIG. 4 is a schematic structural diagram of an embodiment of a service invoking device of the present application.

In some embodiments of the present application, the service invoking device shown in FIG. 4 may be arranged in a message distribution apparatus, for example, any content distribution server or application system server of the CDN 110 shown in FIG. 1. As shown in FIG. 4, the service invoking device 400 may include:

a first message receiving module 410, configured to receive a first service request message sent by a service invoking end;

a first message processing module 420, configured to determine, in response to the first service request message, header information of the first service request message;

a first center determination module 430, configured to determine, under a condition that the header information includes a route identification, a target data center among a plurality of data centers according to the route identification;

a request message sending module 440, configured to send the first service request message to the target data center to enable the first target data center to provide service for the service invoking end.

In the embodiments of the present application, when the first service request message sent by the service invoking end is received, the target data center corresponding to the service invoking end may be determined among the plurality of data centers based on the route identification in the header information of the first service request message and the first service request message may be sent to the determined target data center, so as to enable the first target data center to provide service for the service invoking end. In this way, distribution of the first service request message may be implemented with the route identification quickly and efficiently, so that the efficiency of service invoking is improved.

In some embodiments of the present application, the first center determination module 430 may be specifically configured to:

obtain a preset data center identification;

determine whether the route identification is a legal identification according to the preset data center identification;

determine, under a condition that it is determined that the route identification is the legal identification, the target data center among the plurality of data centers according to the route identification.

In some embodiments of the present application, the first center determination module 430 may be further configured to:

determine whether the route identification includes a first data center identification, the first data center identification being a data center identification that does not match the preset data center identification;

determine, under a condition that it is determined that the route identification does not include the first data center identification, that the route identification is the legal identification.

In some embodiments of the present application, the first center determination module 430 may be further configured to:

determine, under a condition that it is determined that the route identification includes the first data center identification, whether the route identification includes a second data center identification, an identification location of the second data center identification being before an identification location of the first data center identification and the second data center identification matches the preset data center identification;

obtain, under a condition that it is determined that the route identification includes the second data center identification, an operation state of a data center corresponding to each second data center identification;

determine, under a condition that it is determined that the second data center identification includes a third data center identification, that the route identification is the legal identification, the third data center identification being a data center identification corresponding to a data center with a normal operation state.

In some embodiments of the present application, the first center determination module 430 may be further configured to determine, under a condition that it is determined that the route identification is not the legal identification, a target default data center among at least one default data center. The request message sending module 440 may be further configured to send the first service request message to the target default data center, so as to enable the target default data center to provide service for the service invoking end.

In some embodiments of the present application, the first center determination module 430 may be further configured to determine, under a condition that the header information does not include the route identification, a target default data center among at least one default data center. The request message sending module 440 may be further configured to send the first service request message to the target default data center to enable the target default data center to provide service for the service invoking end.

In some embodiments of the present application, the service invoking device 400 may further include:

a route identification receiving module, configured to receive the route identification fed back by the target default data center;

a route identification forwarding module, configured to send the route identification to the service invoking end to enable the service invoking end to generate a second service request message according to the route identification.

In some embodiments of the present application, the first center determination module 430 is also specifically configured to:

obtain an operation state of each data center;

determine, under a condition that the route identification includes a fourth data center identification, the target data center among the plurality of data centers according to the fourth data center identification, the fourth data center identification being a data center identification corresponding to a data center with a normal operation state.

In some embodiments of the present application, the service invoking device 400 may further include:

a first response control module, configured to stop, under a condition that the route identification does not include the fourth data center identification, responding to the first service request message.

In some embodiments of the present application, the first center determination module 430 is also specifically configured to:

determine a fifth data center identification in the fourth data center identification, an identification location of the fifth data center identification being the first in the fourth data center identification;

use a data center corresponding to the fifth data center identification as the target data center.

In some embodiments of the present application, the request message sending module 440 is specifically configured to:

determine a target transmission line from a normal transmission line corresponding to the first target data center;

send the first service request message to the target data center using the target transmission line.

In some embodiments of the present application, the service invoking device 400 may further include:

a line data obtaining module, configured to obtain line invoking data of a plurality of transmission lines corresponding to the target data center, the line invoking data including a number of consecutive invoking failures and/or invoking feedback data;

a first line determination module, configured to determine the normal transmission line among the plurality of transmission lines according to the line invoking data.

In some embodiments of the present application, the service invoking device 400 may further include:

a second line determination module, configured to determine an abnormal transmission line among the plurality of transmission lines according to the line invoking data;

a line live-detection module, configured to perform a live detection on the abnormal transmission line every preset time period to obtain a live detection result;

a third line determination module, configured to update the abnormal transmission line whose live detection result is success as the normal transmission line.

In some embodiments of the present application, the service invoking device 400 may further include:

a second response control module, configured to stop, under a condition that the plurality of transmission lines do not include the normal transmission line, responding to the first service request message.

It should be noted that the service invoking device 400 provided in the embodiments shown in FIG. 4 may implement the various processes and effects achieved by the message distribution apparatus in the method embodiments of FIG. 2 and may realize the same principle, which will not be described here to avoid repetition.

Figure 5:
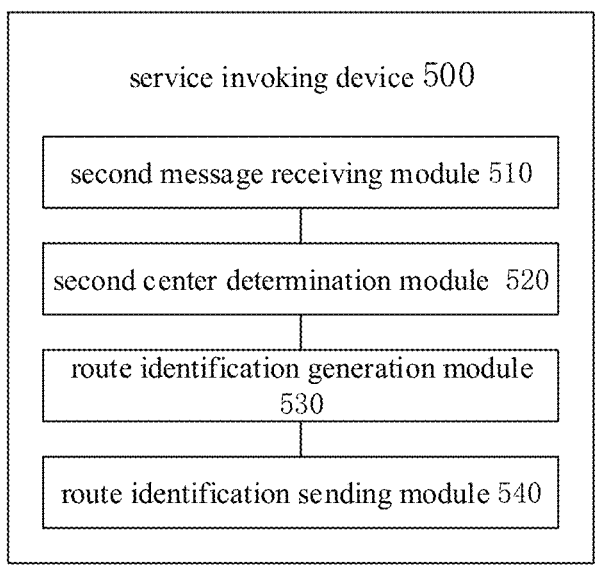
FIG. 5 is a schematic structural diagram of another embodiment of a service invoking device of the present application.

FIG. 5 is a schematic structural diagram of another embodiment of a service invoking device of the present application.

In some embodiments of the present application, the service invoking device shown in FIG. 5 may be arranged in a routing device, for example, the distribution rule server 122 shown in FIG. 1. As shown in FIG. 5, the service invoking device 500 may include:

a second message receiving module 510, configured to obtain a first service request message, header information of the first service request message not include a route identification;

a second center determination module 520, configured to allocate a target data center among a plurality of data centers to a service invoking end that sends the first service request message;

a route identification generation module 530, configured to generate a route identification corresponding to the service invoking end according to a data center identification corresponding to the target data center;

a route identification sending module 540, configured to send the route identification corresponding to the service invoking end to the service invoking end.

In the embodiments of the present application, the route identification may be generated for the service invoking end that sends the first service request message without the route identification in the header information, so that the service invoking end may generate a new service invoking request according to the route identification. In this way, when the message distribution apparatus receives a service request message sent by the service invoking end again, it may determine the target data center corresponding to the service invoking end based on the route identification, and send the service request message to the target data center. Thus, distribution of the first service request message can be realized quickly and efficiently, and the efficiency of service invoking can be improved.

In some embodiments of the present application, the second center determination module 520 may be specifically configured to:

determine a load amount of each data center;

allocate, according to the load amount, the target data center among the plurality of data centers to the service invoking end that sends the first service request message.

In some other embodiments of the present application, the second center determination module 520 may also be specifically configured to:

obtain request user information corresponding to the first service request message, the request user information including at least one of a request user identification and request user location information;

allocate, according to the request user information, the target data center among the plurality of data centers to the service invoking end that sends the first service request message.

It should be noted that the service invoking device 500 provided in the embodiments shown in FIG. 5 may implement the various processes and effects achieved by the message distribution apparatus in the method embodiments of FIG. 3 and may realize the same principle, which will not be described here to avoid repetition.

Figure 6:
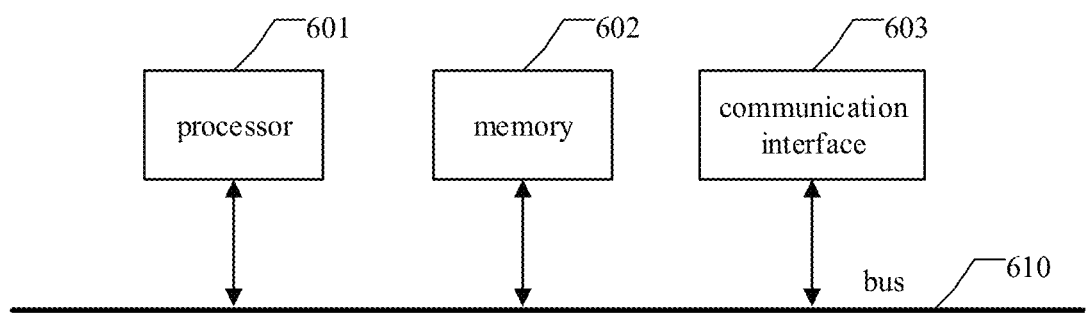
FIG. 6 is a schematic diagram of hardware structure of an embodiment of a service invoking apparatus of the present application.

FIG. 6 is a schematic diagram of hardware structure of an embodiment of a service invoking apparatus of the present application. As shown in FIG. 6, the service invoking apparatus may include a processor 601 and a memory 602 storing computer program instructions.

Specifically, the above processor 601 may include a Central Processing Unit (CPU), or an Application Specific Integrated Circuit (ASIC), or may be configured to be one or more integrated circuits implementing the embodiments of the present application.

The memory 602 may include a mass storage for data or instructions. For example and not limitation, the memory 602 may include a Hard Disk Drive (HDD), a floppy disk driver, a flash memory, an optical disk, a magneto-optical disk, a magnetic tape, or a Universal Serial Bus (USB) driver, or a combination of two or more thereof. Where appropriate, the memory 602 may include a removable or non-removable (or fixed) medium. Where appropriate, the memory 602 may be inside or outside an integrated gateway disaster recovery device. In a particular embodiment, the memory 602 is a non-volatile solid-state memory. In a particular embodiment, the memory 602 includes a read-only memory (ROM). Where appropriate, the ROM can be a mask-programmed ROM, a programmable ROM (PROM), an erasable PROM (EPROM), an electrically erasable PROM (EEPROM), an electrically alterable ROM (EAROM) or a flash memory or a combination of two or more thereof.

The processor 601 may read and execute the computer program instructions stored in the memory 602 to implement the operation of any service invoking method in the above embodiments.

In an example, the service invoking apparatus may further include a communication interface 603 and a bus 610. As shown in FIG. 6, the processor 601, the memory 602, and the communication interface 603 are connected through the bus 610 and realize mutual communication.

The communication interface 603 is mainly used to implement communication between various modules, devices, units and/or apparatus in the embodiments of the present application.

The bus 610 includes hardware, software, or both, and couples the components of the service invoking apparatus to each other. For example and not limitation, the bus may include an Accelerated Graphics Port (AGP) or other graphics bus, an Enhanced Industry Standard Architecture (EISA) bus, a Front Side Bus (FSB), a HyperTransport (HT) interconnect, an Industry Standard Architecture (ISA) Bus, an Infinite Bandwidth Interconnect, a Low Pin Count (LPC) Bus, a Memory Bus, a Micro Channel Architecture (MCA) Bus, a Peripheral Component Interconnect (PCI) Bus, a PCI-E6press (PCI-6) Bus, a Serial Advanced Technology Attachment (SATA) bus, a Video Electronics Standards Association (VESA) Local Bus (VLB) bus or other suitable bus or a combination of two or more thereof. Where appropriate, the bus 610 may include one or more buses. Although the embodiments of this application describe and show a specific bus, this application considers any suitable bus or interconnection.

The service invoking apparatus may execute the service invoking methods in the embodiments of the present application, so as to realize the service invoking methods and devices described in conjunction with FIG. 2 to FIG. 5.

In addition, in combination with the service invoking methods in the above embodiments, the embodiments of the present application may provide a computer-readable storage medium for implementation. The computer-readable storage medium stores computer program instructions thereon which when executed by the processor, implement the operation of any service invoking method in the above embodiments. Examples of the computer-readable storage medium may be a non-transitory computer-readable storage medium, including ROM, RAM, magnetic disks, optical disks, or the like.

It should be clear that the present application is not limited to the specific configuration and processing described above and shown in the figures. For the sake of brevity, a detailed description of known methods is omitted here. In the above embodiments, several specific steps are described and shown as examples. However, the method process of the present application is not limited to the specific steps described and shown. After understanding the spirit of the present application, those skilled in the art may make various changes, modifications and additions, or change the sequence between the steps.

The functional blocks shown in the above structural block diagrams may be implemented as hardware, software, firmware, or a combination thereof. When implemented in hardware, it may be, for example, an electronic circuit, an Application Specific Integrated Circuit (ASIC), an appropriate firmware, a plug-in, a function card, and so on. When implemented in software, the elements of this application are programs or code segments used to perform required tasks. The programs or code segments may be stored in a machine-readable medium, or transmitted on a transmission medium or a communication link through a data signal carried in a carrier wave. "Machine-readable medium" may include any medium that can store or transmit information. Examples of the machine-readable medium include an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and so on. The code segments can be downloaded via a computer network such as the Internet, an intranet, and so on.

It should also be noted that the exemplary embodiments mentioned in this application describe some methods or systems based on a series of steps or devices. However, the present application is not limited to the order of the above steps, that is, the steps may be executed in the order as mentioned in the embodiments, or may be executed in an order different from that of the embodiments, or several steps may be executed at the same time.

The above are only specific implementations of the application, and those skilled in the art can clearly understand that for the convenience and conciseness of description, the specific operation process of the above-described systems, modules and units may refer to the corresponding process of the foregoing method embodiments, which will not be repeated here. It should be understood that protection scope of this application is not limited to this, and any person skilled in the art can easily conceive various equivalent modifications or substitutions within the technical scope disclosed in this application, and these modifications or substitutions.

What is claimed is:

1. A service invoking method, comprising:
   receiving a first service request message sent by a service invoking end;
   determining, in response to the first service request message, header information of the first service request message;
   determining, under a condition that the header information comprises a route identification, a target data center among a plurality of data centers according to the route identification;
   sending the first service request message to the target data center to enable the target data center to provide service for the service invoking ends;
   determining, under a condition that the header information does not include the route identification, a target default data center among at least one default data center;
   sending the first service request message to the target default data center to enable the target default data center to provide service for the service invoking end;
   receiving the route identification fed back by the target default data center; and
   sending the route identification to the service invoking end to enable the service invoking end to generate a second service request message according to the route identification.

2. The method according to claim 1, wherein the determining a target data center among a plurality of data centers according to the route identification comprises:
   obtaining a preset data center identification;
   determining whether the route identification is a legal identification according to the preset data center identification;

determining, under a condition that it is determined that the route identification is the legal identification, the target data center among the plurality of data centers according to the route identification.

3. The method according to claim 2, wherein the determining whether the route identification is a legal identification according to the preset data center identification comprises:

determining whether the route identification comprises a first data center identification, wherein the first data center identification is a data center identification that does not match the preset data center identification;

determining, under a condition that it is determined that the route identification does not comprise the first data center identification, that the route identification is the legal identification.

4. The method according to claim 3, wherein after the determining whether the route identification comprises a first data center identification, the method further comprises:

determining, under a condition that it is determined that the route identification comprises the first data center identification, whether the route identification comprises a second data center identification, wherein an identification location of the second data center identification is before an identification location of the first data center identification and the second data center identification matches the preset data center identification;

obtaining, under a condition that it is determined that the route identification comprises the second data center identification, an operation state of a data center corresponding to each second data center identification;

determining, under a condition that it is determined that the second data center identification comprises a third data center identification, that the route identification is the legal identification, wherein the third data center identification is a data center identification corresponding to a data center with a normal operation state.

5. The method according to claim 2, wherein after the determining whether the route identification is a legal identification according to the preset data center identification, the method further comprises:

determining, under a condition that it is determined that the route identification is not the legal identification, a target default data center among at least one default data center;

sending the first service request message to the target default data center to enable the target default data center to provide service for the service invoking end.

6. The method according to claim 1, wherein the determining a target data center among a plurality of data centers according to the route identification comprises:

obtaining an operation state of each data center;

determining, under a condition that the route identification comprises a fourth data center identification, the target data center among the plurality of data centers according to the fourth data center identification, wherein the fourth data center identification is a data center identification corresponding to a data center with a normal operation state.

7. The method according to claim 6, further comprising:

stopping, under a condition that the route identification does not comprise the fourth data center identification, responding to the first service request message.

8. The method according to claim 7, wherein the determining the target data center among the plurality of data centers according to the fourth data center identification comprises:

determining a fifth data center identification in the fourth data center identification, wherein an identification location of the fifth data center identification is the first in the fourth data center identification;

using a data center corresponding to the fifth data center identification as the target data center.

9. The method according to claim 1, wherein the sending the first service request message to the target data center comprises:

determining a target transmission line from a normal transmission line corresponding to the target data center;

sending the first service request message to the target data center using the target transmission line.

10. The method according to claim 9, wherein before the determining a target transmission line from a normal transmission line corresponding to the target data center, the method further comprises:

obtaining line invoking data of a plurality of transmission lines corresponding to the target data center, wherein the line invoking data includes a number of consecutive invoking failures and/or invoking feedback data;

determining the normal transmission line among the plurality of transmission lines according to the line invoking data.

11. The method according to claim 10, wherein after the obtaining line invoking data of a plurality of transmission lines corresponding to the target data center, the method further comprises:

determining an abnormal transmission line among the plurality of transmission lines according to the line invoking data;

performing a live detection on the abnormal transmission line every preset time period to obtain a live detection result;

updating the abnormal transmission line whose live detection result is success as the normal transmission line.

12. The method according to claim 10, wherein after the determining the normal transmission line among the plurality of transmission lines according to the line invoking data, the method further comprises:

stopping, under a condition that the plurality of transmission lines do not comprise the normal transmission line, responding to the first service request message.

13. A service invoking method, comprising:

obtaining a first service request message, wherein header information of the first service request message does not comprise a route identification;

allocating a target data center among a plurality of data centers to a service invoking end that sends the first service request message;

generating a route identification corresponding to the service invoking end according to a data center identification corresponding to the target data center; and sending the route identification corresponding to the service invoking end to the service invoking end, wherein allocating a target data center among a plurality of data centers to a service invoking end that sends the first service request message further includes obtaining request user information corresponding to the first service request message, wherein the request user information includes at least one of a request user identification and request user location information, and allocating, according to the request user information, the target data center among the plurality of data centers to the service invoking end that sends the first service request message.

14. The method according to claim 13, wherein the allocating a target data center among a plurality of data centers to a service invoking end that sends the first service request message comprises:

determining a load amount of each data center;

allocating, according to the load amount, the target data center among the plurality of data centers to the service invoking end that sends the first service request message.

15. A service invoking apparatus, comprising: a processor and a memory storing computer program instructions, wherein the processor, when executing the computer program instructions, implements an operation of the service invoking method according to claim 1.

16. A service invoking apparatus, comprising: a processor and a memory storing computer program instructions, wherein the processor, when executing the computer program instructions, implements an operation of the service invoking method according to claim 13.

* * * * *